Nov. 20, 1928.  1,692,160
J. A. DORMER
MECHANICAL MOVEMENT
Filed June 9, 1925  2 Sheets-Sheet 1
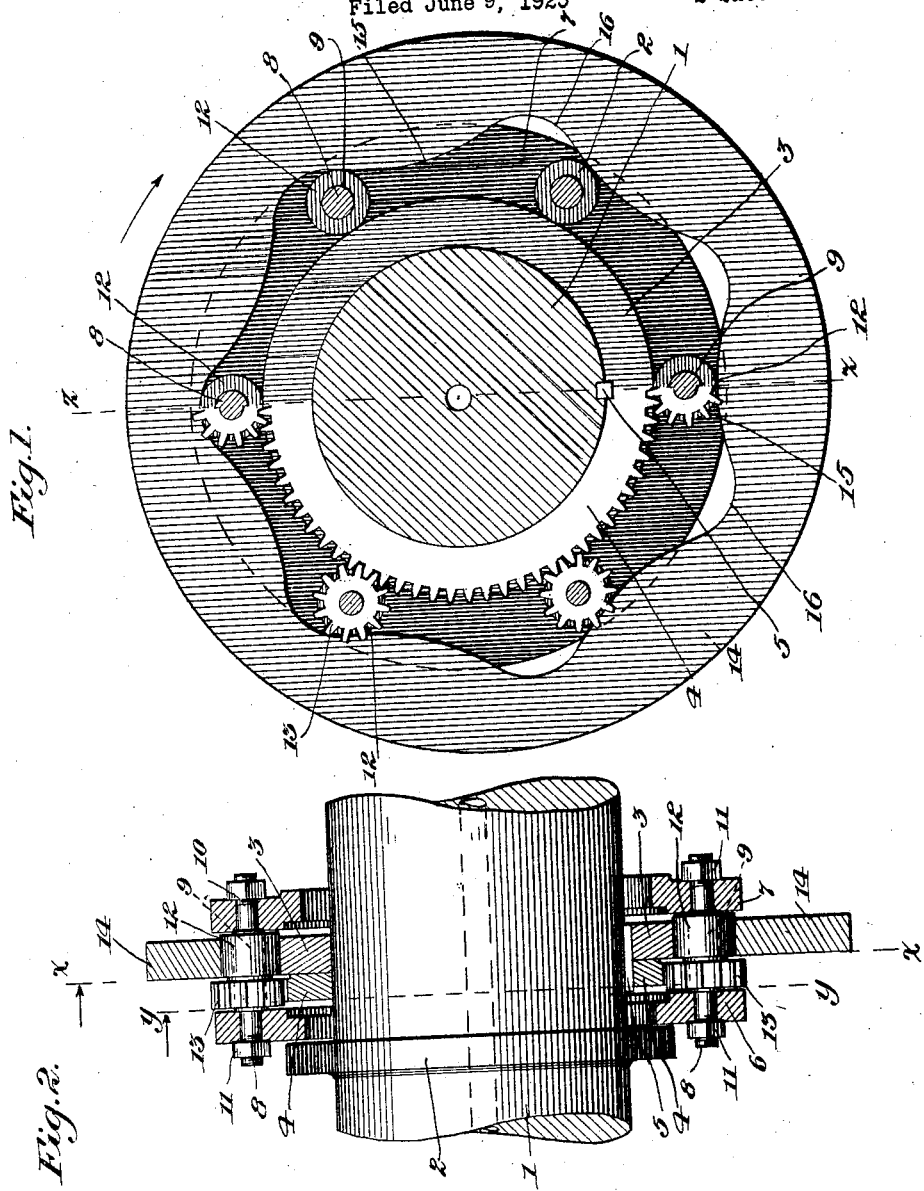
Inventor:
John A. Dormer
by E. A. Pinnell
Att'y.

Nov. 20, 1928.  
J. A. DORMER  
MECHANICAL MOVEMENT  
Filed June 9, 1925  
1,692,160  
2 Sheets-Sheet 2

Inventor:  
John A. Dormer  
by ___ Atty.

Patented Nov. 20, 1928.

1,692,160

UNITED STATES PATENT OFFICE.

JOHN ALOYSIUS DORMER, OF DETROIT, MICHIGAN.

MECHANICAL MOVEMENT.

Application filed June 9, 1925. Serial No. 35,919.

This invention relates to a multiple eccentric motion mechanism or device for converting motion, and particularly producing a multiplicity of eccentric motions during one revolution of a driven rotary element.

The object of the invention is to provide a mechanical movement, by which a multiple of eccentric, vibrating or other motions are produced per single revolution of the device, thereby permitting decreased velocity where an increased or high number of intermittent motions are required or necessary per any desired unit of time.

A further object of the invention, is to provide a mechanical movement, whereby heavier loads may be carried, less friction and less heat will be developed, less power required for operating the device, less lubrication necessary, less wear and consequent greater economy in renewal of parts, maintenance lower and consequently economy in labor effected, and thereby providing a device of this sort which renders more continuous service.

The invention consists in a mechanical movement, comprising an inner ring, an outer ring, one of said rings having a cam surface, and rollers interposed between said rings and engaging said cam surface, one of said rings adapted to be rotated to cause said rollers to move over said cam surfaces to effect an eccentric or other motion of the other ring.

The invention also consists in a mechanical movement, comprising an inner ring, an outer ring, one of said rings having a cam surface, a fixed gear adjacent to one of said rings, rollers interposed between said rings and engaging said cam surface, and gear wheels keyed to said rollers and engaging said fixed gear, one of said rings adapted to be rotated to cause said rollers to be rotated and moved over said cam surface to effect an eccentric or other motion of the other ring.

The invention also consists in other details, combination and arrangement of parts, all substantially as I will proceed now more particularly to set forth and finally claim.

Figure 3:
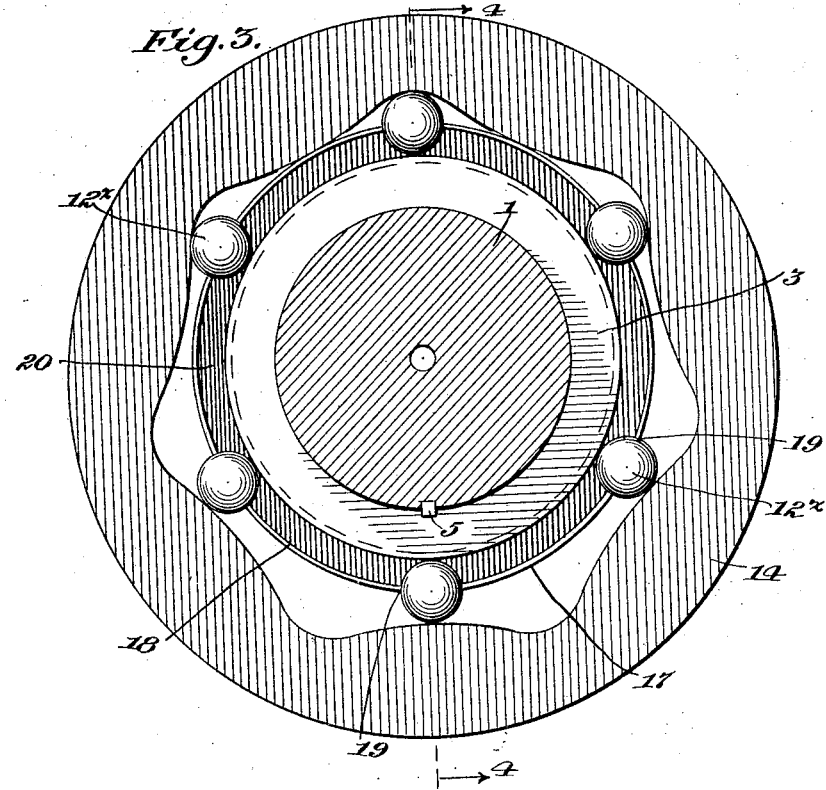
Figure 4:
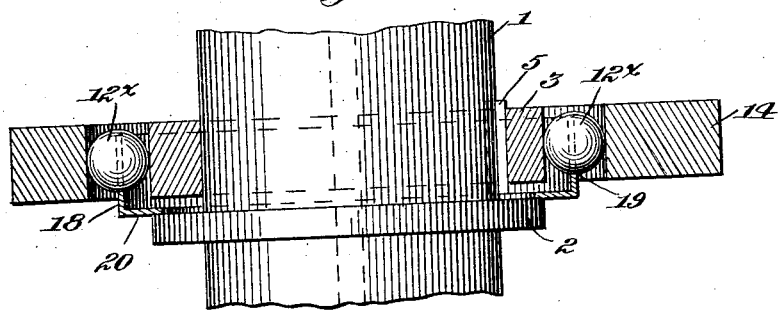

In the accompanying drawings, illustrating the invention, in the several figures of which like parts are similarly designated, Figure 1 is a two-part sectional plan view, the right-hand side being taken substantially in the plane of line $x$—$x$, Fig. 2 and looking in the direction of the arrow, the cheek-piece of the roller cage and the gears being omitted, and the left-hand side being taken substantially in the plane of line $y$—$y$, Fig. 2, and looking in the direction of the arrow, the cheek-piece only, of the roller cage, being omitted. Fig. 2 is a central vertical section taken substantially in the plane of line $z$—$z$, Fig. 1, the rollers and gear wheels being shown in full lines. Fig. 3 is a plan view of a modified form of the invention, and Fig. 4 is a central cross-section thereof, taken substantially in the plane of line 4—4, Fig. 3 and looking in the direction of the arrows.

In the drawings, Figs. 1 and 2, 1 is a cylindrical post having an annular flange 2, and adapted to be fixed to a frame or other support. Mounted upon the post 1 is an annular ring 3, and an annular gear 4, having its pitch diameter identically the same as the outer diameter of the ring 3, the said ring and gear being keyed to the post 1 by a key 5.

Also mounted upon or about the post 1 is a roller cage, comprising two cheek-pieces 6 and 7, arranged upon opposite sides of and embracing the ring 3 and gear 4. Fixed in the cheek-pieces 6 and 7 at suitable and equal distances apart, are a series of shafts 8 having enlarged central portions 9 and reduced end portions 10, engaging holes in the cheek-pieces and adapted to receive nuts 11 to bind said shafts in the cheek-pieces, the enlarged central portions of the shafts serving to hold the cheek-pieces in proper spaced relation to embrace and receive the other parts of the device.

Loosely mounted upon the enlarged portions 9 of the shafts 8 between the cheek-pieces 6 and 7 are rollers 12 adapted to engage the periphery of the annular ring 3, and pinions or gear wheels 13 fixed to the rollers 12, adapted to mesh with the annular gear 4.

The cheek-piece 6 of the roller cage abuts against the flange 2 of the post 1 and thus tends to hold the roller cage in position upon the post.

Loosely mounted upon the roller cage, between the cheek-pieces thereof, is an outer ring 14, having upon its inner periphery a series of equally spaced cam surfaces 15 and intermediate depressions 16, adapted to engage at all times throughout each revolution the rollers 12 carried by the roller cage, the cam surfaces and the depressions, or highs and lows, of the cam ring 14 being arranged at diametrically opposite points, and the rollers 12 in the roller cage are so positioned and spaced with relation to the cam surfaces of the ring 14 that all the rollers will at all times engage the cam surfaces of ring 14, due consideration and allowance being made for clearance and wear. For the purpose of carrying out the operation of the invention, the cam ring is provided with any suitable number of cam highs and the roller cage provided with just one less number of rollers for engaging the cam highs and, as shown, the outer ring 14 is provided with seven cam highs and seven intermediate depressions, and the roller cage provided with six rollers to effect the operation just described.

In the operation of the device, power may be applied to either the outer ring 14 or the inner ring 3, to effect rotation of the ring to which power is applied. In either instance the rollers 12 are caused to rotate by friction between the cam surface of ring 14 and the periphery of the inner ring 3, and roll about the inner ring and at a slower speed than the rotation of the outer cam ring, and thereby effect a rapid and multiple eccentric or reciprocating or vibrating movement of either ring during a single revolution of the driven ring.

During the operation of the device, the series of pairs of diametrically opposite rollers 12 successively engage the diametrically opposite highs and lows of the cam surfaces 15 and 16 of the cam ring, due to the differential movement between the roller cage and the outer cam ring, and as shown in Fig. 1, and supposing the outer cam ring is rotated in the direction of the arrow, the vertical pair of diametrically opposite rollers 12, are in engagement with the vertical high and low of the diametrically opposite cam surfaces, and the succeeding rollers to the right of the vertically positioned rollers are successively and increasingly advancing from the highs to the lows of the cam surfaces, while the advancing rollers to the left of the vertically positioned rollers have passed over the lows and successively and increasingly advancing to the highs of the cam surfaces of the cam ring. Thus it will be seen that by the rotation of the outer cam ring, the pairs of diametrically opposite rollers in their orbital movement between the inner and outer rings, will successively engage the diametrically opposite highs and lows of the successive cam surfaces in the outer cam ring, while the intermediate rollers are riding over the intermediate cam surfaces and thus produce a multiple of eccentric or reciprocating or vibrating motions of the outer cam ring during a single revolution of the cam ring.

During the operation of the device, the pinions or gear wheels 13 on shafts 9, and fixed to the rollers 12, and engaging the fixed annular gear 4, will cause a positive revolution of rollers 12 and the roller cage about the post 1.

However, it will be understood that the device may be operated to carry out the effect and purpose intended without the gearing just described and the gearing omitted and the operation effected by the friction between the rollers and the inner ring and outer cam ring, and this is true under ordinary loading conditions, where slippage would not be sufficient to require the use of the gearing, and which could be omitted for sake of economy in the installation of the device.

Furthermore, it will be understood that nature of duty, speed and work required, would govern the eccentric throw and the number of eccentric or other motions per revolution of the cam ring, and this would necessitate a varying number of rollers and varying number of cam surfaces, and variation of composition of material used in constructing the parts.

In Figs. 3 and 4 I have shown a modified form of the invention, wherein balls may be substituted for the cylindrical rollers and the two-part cage or carrier therefor, as in the arrangement hereinbefore described and as shown in Figs. 1 and 2, and in said Figs. 3 and 4, 1, is the post, having the supporting collar or flange 2, and upon which the device is mounted, 3 is the inner ring fixed to the post by key 5, and 14 is the outer ring surrounding the inner ring, all substantially as in the arrangement hereinbefore described. In this form of the device, balls $12^x$ are arranged between and frictionally engage the periphery of the inner ring 3 and the inner cam surface of the outer ring 14, and said balls are mounted and suitably fixed in spaced relation in a ball cage or carrier 17, comprising an annular ring 18, and suitable pockets 19 therein for retaining the balls in spaced relation, and an inwardly projecting overhanging flange 20 adapted to engage any suitable guide or support, such as the collar or flange 2 of the post 1, as shown in the drawing, Fig. 4, and it will be understood that both forms of the device, as herein illustrated, irrespective of the post 1 and its collar 2, may be applied to various kinds of machines or apparatus, wherein it is desired to produce a rapid or multiple succession of intermittent eccentric or reciprocating motions, and the support for the various parts of the device to permit of its operation in its various applications may be varied to suit the application of the device, in accordance with the nature and duty required by the machine or apparatus in which the device is used.

By this invention a multiple eccentric or other motion device is provided, which affords an actuating mechanism particularly designed for use in all classes of crushing mills, but which may be used in connection with any other machine or part of machine, where an eccentric motion is required, and where it is desired to produce a vibrating, oscillating, or reciprocating motion, or any other form of intermittent force application, intermittent contact, or intermittent transmission of power or work.

It will be understood that the invention is not limited to the exact details of construction, combination and arrangement of parts herein shown and described, and that the invention is susceptible of numerous and various changes and alterations, and still be within the scope of the claims herein made.

It will be understood that in accordance with the invention and the principle thereof, the inner ring may be provided with cam surfaces and the outer ring plane, instead of the arrangement shown in the accompanying drawings, wherein the outer ring is provided with the cam surfaces and the inner ring plane, and in this instance an even number of rollers and an odd number of cam surfaces or highs are required, whereas when it is desired to provide the device with the cam surfaces on the inner ring and a plane outer ring, an odd number of rollers and even number of cam rises or highs are necessary, and in this instance the rollers would not be diametrically opposite.

What I claim is:

1. A multiple eccentric motion mechanism comprising inner and outer rings, one of which is adapted to be driven, one of said rings being provided with a series of cam-surfaces, and cam engaging members interposed between said rings and engaging said cam surfaces, one of said rings being mounted to maintain a fixed axis and the other to turn eccentrically to said axis, whereby a multiplicity of eccentric motions are produced during one revolution of the driven ring.

2. A multiple eccentric motion mechanism comprising inner and outer rings, one of which is adapted to be driven, one of said rings being provided with a series of cam surfaces, and rollers interposed between said rings and engaging said cam surfaces, one of said rings being mounted to turn about a fixed axis and the other to turn eccentrically to said axis, whereby a multiplicity of eccentric motions are imparted by the driven ring to the other ring during one revolution of the driven ring.

3. A multiple eccentric motion mechanism as called for in claim 1, wherein the series of cam surfaces include diametrically opposed highs and lows with the rollers arranged for engaging successive diametrically opposed highs and lows of said cam surfaces.

4. A multiple eccentric motion mechanism, comprising an inner ring and an outer ring, one of said rings being driven, one of said rings being provided with a series of cam surfaces having diametrically opposite highs and lows, a roller cage, and a series of rollers mounted in said cage at diametrically opposite points and interposed between said rings and engaging said cam surfaces, said rollers maintaining traction contact between said rings, one of said rings being mounted to maintain a fixed axis and the other to turn eccentrically to said axis, whereby a rotary motion of one ring is converted into a multiplicity of eccentric motions for the other ring during one revolution of the driven ring.

5. A mechanical movement, comprising an inner ring and an outer ring, one of said rings being provided with a series of cam surfaces having diametrically opposite highs and lows, a roller cage mounted upon said rings, a series of rollers mounted in said cage at diametrically opposite points and interposed between said rings and engaging said cam surfaces, and gearing connecting said rollers and one of said rings for positively rotating the rollers.

6. A multiple eccentric motion mechanism comprising a fixed inner ring, a driven outer ring surrounding said inner ring and having its inner periphery provided with a series of cam surfaces, and rollers interposed between said rings and engaging the cam surfaces of said driven outer ring so that during one revolution of said driven ring the cam surfaces thereof will cooperate with said rollers in causing a multiplicity of eccentric motions to be imparted to said driven outer ring.

7. A mechanical movement comprising a fixed inner ring, a driven outer ring surrounding said inner ring and having a series of cam surfaces, and a series of equally spaced opposed rollers interposed between said rings and adapted to cooperate with said cam surfaces in imparting a multiple eccentric motion to said driven outer ring during each revolution thereof.

8. A mechanical movement, comprising a fixed inner ring, an annular gear fixed to said inner ring, a movable outer ring surrounding said inner ring and having a series of cam surfaces upon its inner periphery, a roller cage mounted upon said rings, a series of rollers mounted in said cage and interposed between said rings and engaging the cam surfaces of said movable outer ring and said inner ring, and pinions fixed to said rollers and engaging said annular gear.

In testimony whereof I hereunto affix my signature.

JOHN ALOYSIUS DORMER.